(12) United States Patent
Gu

(10) Patent No.: US 8,134,247 B2
(45) Date of Patent: Mar. 13, 2012

(54) PORTABLE WIND-DRIVEN ALTERNATOR

(76) Inventor: Robert Liang-Mo Gu, Mobile, AL (US)

( * ) Notice: Subject to any disclaimer, the term of this patent is extended or adjusted under 35 U.S.C. 154(b) by 21 days.

(21) Appl. No.: 12/789,449

(22) Filed: May 27, 2010

(65) Prior Publication Data

US 2011/0291420 A1 Dec. 1, 2011

(51) Int. Cl.
*F03D 9/00* (2006.01)
(52) U.S. Cl. ......................................................... 290/44
(58) Field of Classification Search .................. 290/44, 290/55; 415/4.2, 4.1, 2.1, 4.5, 905; 60/398
See application file for complete search history.

(56) References Cited

U.S. PATENT DOCUMENTS

| | | | | |
|---|---|---|---|---|
| 3,876,925 A * | 4/1975 | Stoeckert | ............................ | 322/1 |
| 4,075,545 A * | 2/1978 | Haberer | ............................ | 322/35 |
| 4,179,007 A * | 12/1979 | Howe | ............................... | 180/2.2 |
| 4,346,305 A * | 8/1982 | White | ............................... | 290/55 |
| 5,760,515 A * | 6/1998 | Burns | ............................ | 310/115 |
| 2003/0057707 A1* | 3/2003 | Wu | .................................. | 290/55 |
| 2005/0001433 A1* | 1/2005 | Seelin | ............................. | 290/44 |
| 2007/0108775 A1* | 5/2007 | McDavid | ......................... | 290/55 |
| 2007/0296217 A1* | 12/2007 | Ketcham | ......................... | 290/55 |
| 2007/0296219 A1* | 12/2007 | Nica | ................................. | 290/55 |
| 2010/0001531 A1* | 1/2010 | Kulde | ............................. | 290/55 |
| 2011/0085909 A1* | 4/2011 | Chapman | ....................... | 416/174 |
| 2011/0133453 A1* | 6/2011 | Merswolke et al. | ............ | 290/44 |

* cited by examiner

*Primary Examiner* — Julio Gonzalez

(57) ABSTRACT

This is a new model of windmill. This new invention thoroughly changes the model of "Horizontal Axle Three Propellers" to the "Special Squirrel Cage made from the Paddle Blade and the Wind Wheel". This "Portable Wind-driven Alternator" can output great amount of power and become practically useful. This "Portable Wind-driven Alternator" can be installed on ships, trains, automobiles and many other vehicles. The portable wind-driven alternator's design resistance is very small, safe and the model is able to charge the battery of vehicles when the vehicles travel at high speeds.

4 Claims, 10 Drawing Sheets

PORTABLE WIND-DRIVEN ALTERNATOR

BACKGROUND OF THE INVENTION

1. Field of the Invention

It is well known, the wind energy is obtained through the windmill. When the wind pushes the Paddle Blades, rotates the Wind Wheel around the axis, turning wind energy into mechanical energy. The amount of converted energy is directly proportional to the air density, area that the wind sweeps and square of the wind speed.

Because the wind turbine obtains the energy and decelerates the wind, which leads to some degree limits the wind turbine. German physicist Albert Betz concluded in 1919: regardless of any kind of wind turbine design, the maximum possible output energy of a turbine is 59% of the input energy. Nowadays we can achieve only about 30% of that theoretical efficiency limit of the propeller type turbines in practice. The common efficiency ranges from 1% to 20% for the propeller type turbine, which is about 35% of the vertical axis three-dimensional turbines like Darrieus or Gorlov turbine.

As shown in FIG. 10. (for tradition wind-driven generator only) demonstrates the relationship between the wind speed (frequency) and the energy production (energy). The curves are the Rayleigh distributed for the same average wind speed. Histogram shows the measured data. This curve is a good match for tradition wind-driven generator only, but not for the Portable Wind-driven Alternator.

Because the electrical energy generated is proportional to the square of the wind speed, we can obtain larger amount of energy if we have the greater wind speed. The effective working time only accounts for 15% of the operation time for tradition wind-driven generators, but 100% for Portable Wind-driven Alternator. The Portable Wind-driven Alternators work with the wind speed approximately the same as the speed of vehicles. Example for electrical car: When the electrical car drive 75 mile per hour, the Portable Wind-driven Alternator operates at the wind speed of 33 m/s, the wind pressure is 68 kg per square meter.

$$W_0 = V^2/16 \text{ kg/m}^2)$$

$W_0$—Wind pressure
V—Wind speed

Wind Energy rotates the special squirrel cage—Wind Wheel (2), according to the Lever Law, the Wind Energy rotates the Wind Wheel (2) by pushing the Paddle Blades (1) easily, smoothly and in increasing speed; so the Alternator can charge the battery of an electrical car traveling on the way. And then the electrical car will have an extended running time.

2. Description of the Prior Art

Through the study of patents below,

| U.S. PATENT DOCUMENTS | | | |
|---|---|---|---|
| 6,624,530 | B1 | September 2003 | Toulon |
| 6,897,575 | B1 | May 2005 | Yu |
| 7,105,940 | B2 | September 2006 | Weesner et al |
| 2006/0213697 | A1 | September 2006 | Sutherland |
| 2007/0153537 | A1 | July 2007 | Scott et al. |
| 7,339,286 | B1 | May 2008 | Chen |
| FOREIGN PATENT DOCUMENTS | | | |
| CA | 2.296.794 | | July 2001 |
| WO | WO 03/008223 | A1 | January 2003 |

We found that all those Portable Wind Power Generator stick to the model of "Horizontal Axle Propeller", with which can only make out toy-like Portable Wind Power Generator.

The energy obtained by a Wind-driven Alternator is proportional to the area of Air-Intake, and the $3^{rd}$ power of the wind speed.

The classic formula is $$Pw = \frac{1}{2} \times \rho A V^3 \eta \times \frac{1}{102} \text{ (kW)}$$

Pw—Total power
$\rho$—Air density (kg/m$^3$)
A—The area of Air-Intake (sweep area) (m$^2$)
v—Wind speed (m/s)
$\eta$—Efficiency of the alternator (usually equals to 0.4)

From the formula above, we can see that the wind speed and area of Air-Intake are the keys of amount of the total generated power. If the wind speed is fixed, the Air-Intake area of the Wind-driven Generator will determine the output power of the Generator.

So those designs with too small Paddle Blades will have small area of Air-Intake and thus small output power which will make the design useless. However, our invention thoroughly changes the model so that it can output great amount of power and become useful practically.

SUMMARY OF THE INVENTION

This invention's goal is to implement a new idea to improve the traditional Wind-driven Alternator into a portable and practical one. Countless vehicles are running on the street, on the river, across the ocean, along the rail roads all over the world and they
are consuming enormous amounts of fuel every day. The burning of these fuels results in smog emissions that contribute to air pollutions and health problems. Moreover, in the mining phase of fuel processing, continually disasters, such as well mine explosion, collapse, and other accidents. The pollution and global warming will also be a serious problem. In addition, fuel has always been a strategic necessity for many countries over the world and there are more and more signals of a world class fuel crisis. What is worse, when the price of fuel goes up, inflations will inevitably follow. The point is that we usually neglect the precious handy Wind Energy.

For the above purposes, this new invention introduces "Portable Wind-driven Alternator (11)" to utilize the precious, stable and reliable Wind Energy when the vehicles keep running at high speed.

To overcome the existing technical weakness of the unwieldy and huge tradition wind-driven generators, we present a special squirrel cage as a solution. The Special Squirrel Cage made from the Paddle Blade (1) and the Wind Wheel (2). Every Paddle Blade (1) is rectangular, with the length and area same as those of the Air Intake (6). The Length of the Air Intake (6) is the same as width of vehicle. The Air Intake (6) area and the number of Paddle Blades (1) must be compatible to the power of the Alternators (3). The length and area of the Air Exhaust (7) are also the same as those of the Air Intake (6). With those designs, Portable Wind-driven Alternator can provide clean and quiet electricity at maximum efficiency.

DESCRIPTION OF THE REFERENCED NUMERALS (1) Paddle Blade
    (1-1) Paddle Blade
    (1-2) Paddle Blade
    (1-3) Paddle Blade
    (1-4) Paddle Blade
(2) Wind Wheel
(3) Alternator
(4) Wheel Hub
(5) Alternator Support
(6) Air Intake
(7) Air Exhaust
(8) Axle Sleeve
(9) Wheel Support
(10) Outside of Wheel Hub
(11) Portable Wind-driven Alternator
(12) New Vehicles
(13) Use Vehicles
(14) Swivel Joint
(15) Wind Director
(16) Superstructure

DETAILED DESCRIPTION OF THE PREFERRED EMBODIMENTS

Figure 1:
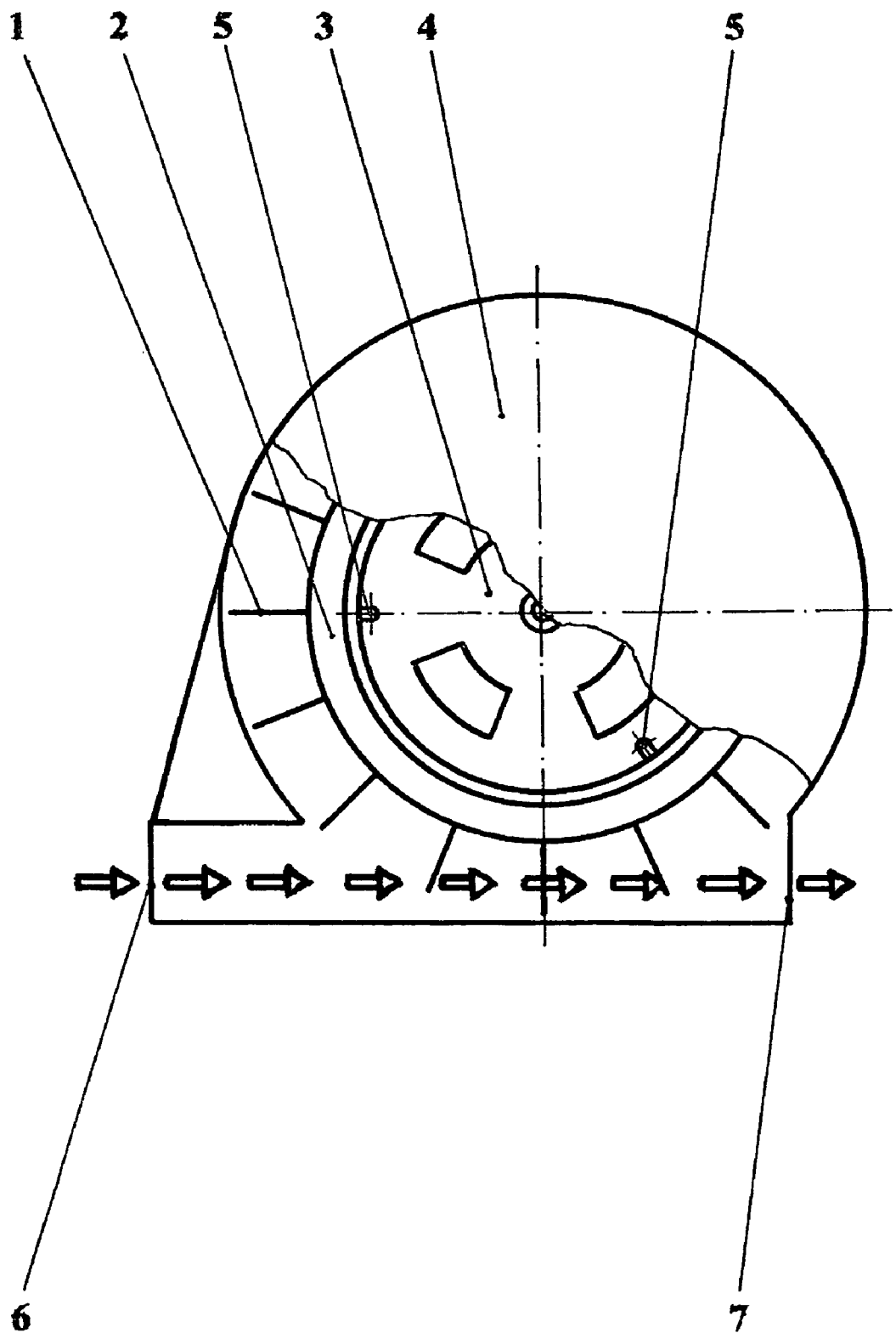
FIG. 1, structure schematic drawing of the new invention Portable Wind-driven Alternator.
Figure 2:
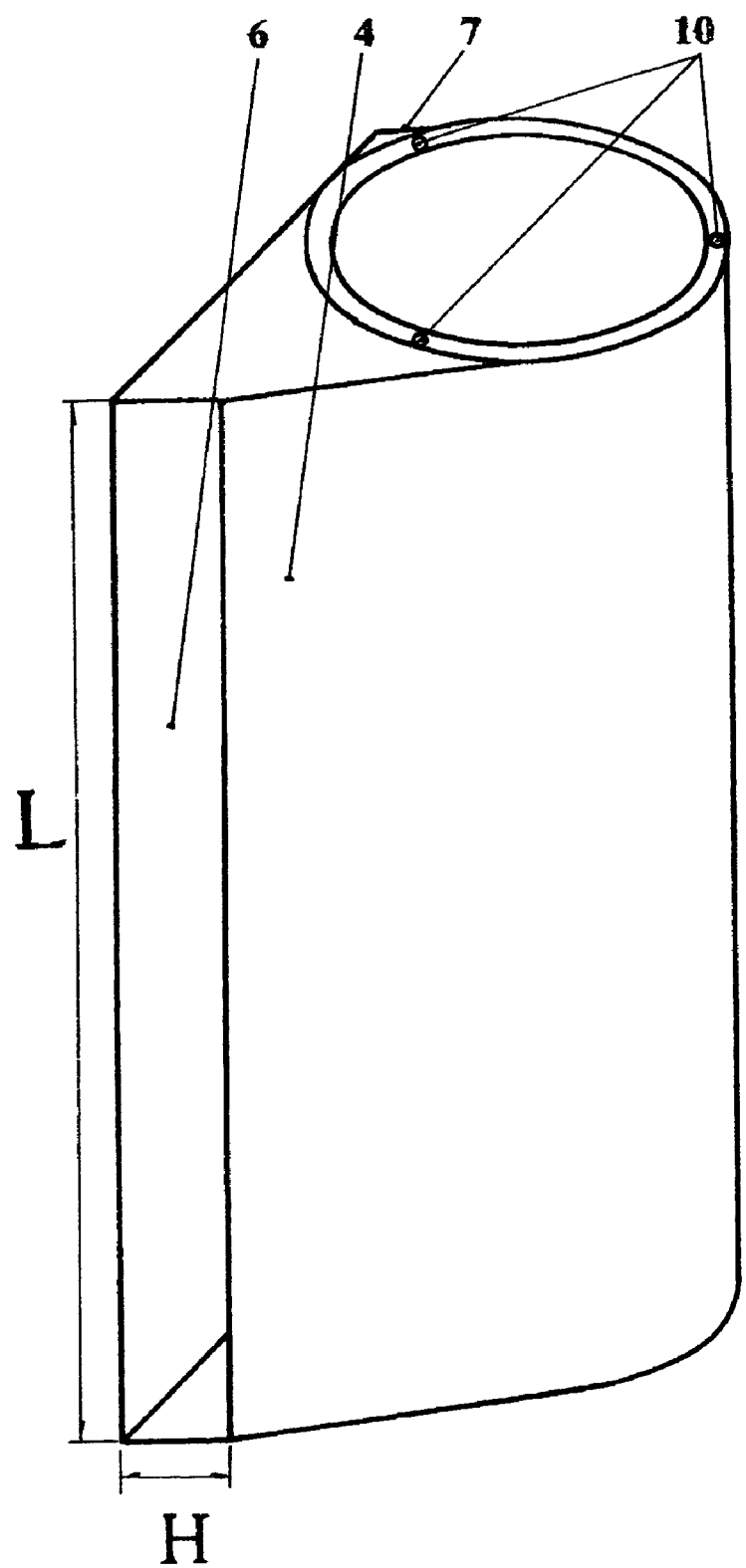
FIG. 2, Wind Wheel Hub (4) structure schematic drawing of this new invention.
Figure 3:
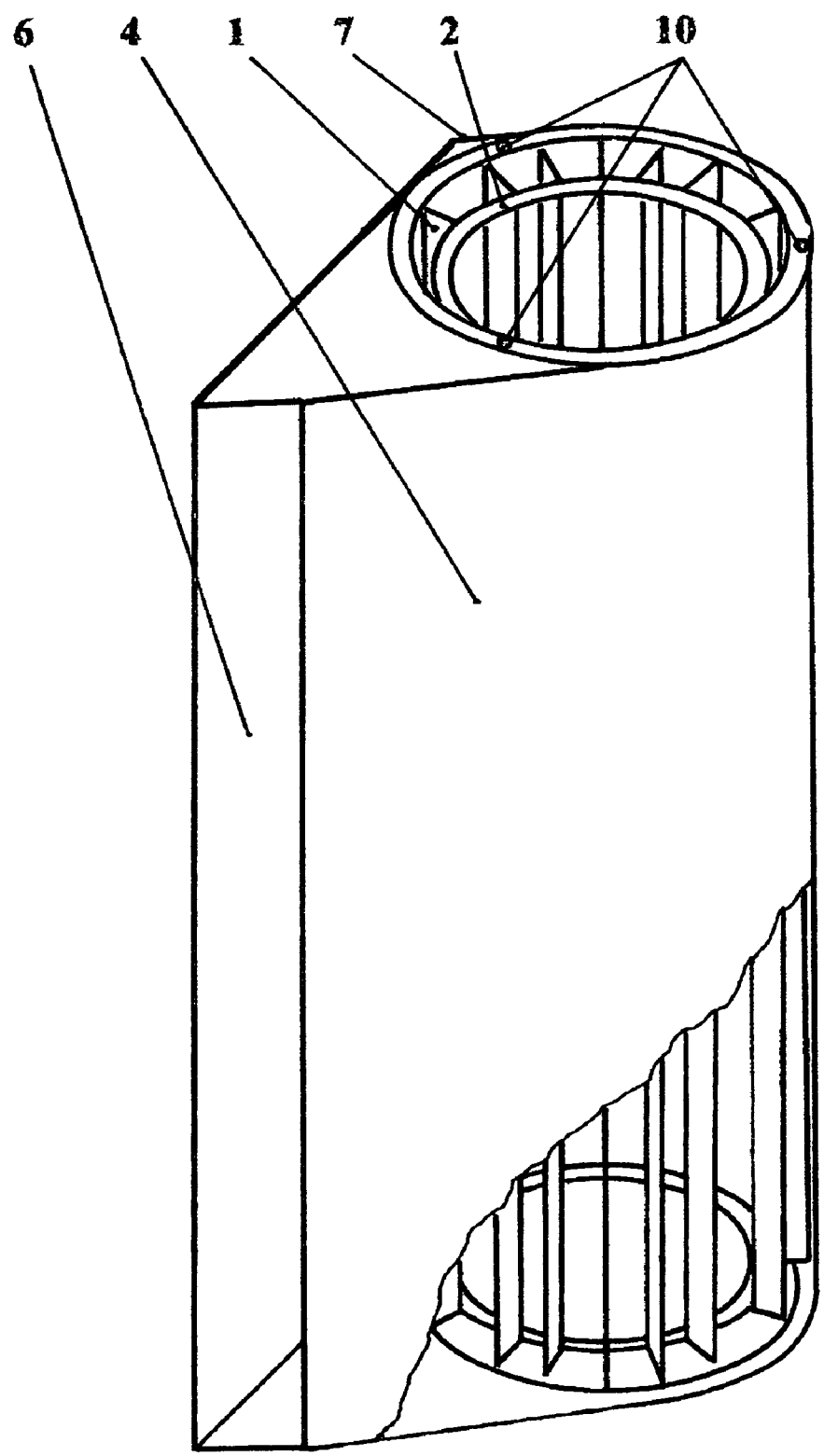
FIG. 3, Wind Wheel (2) and Wheel Hub's (4) structure schematic drawing of this new invention.
Figure 4:
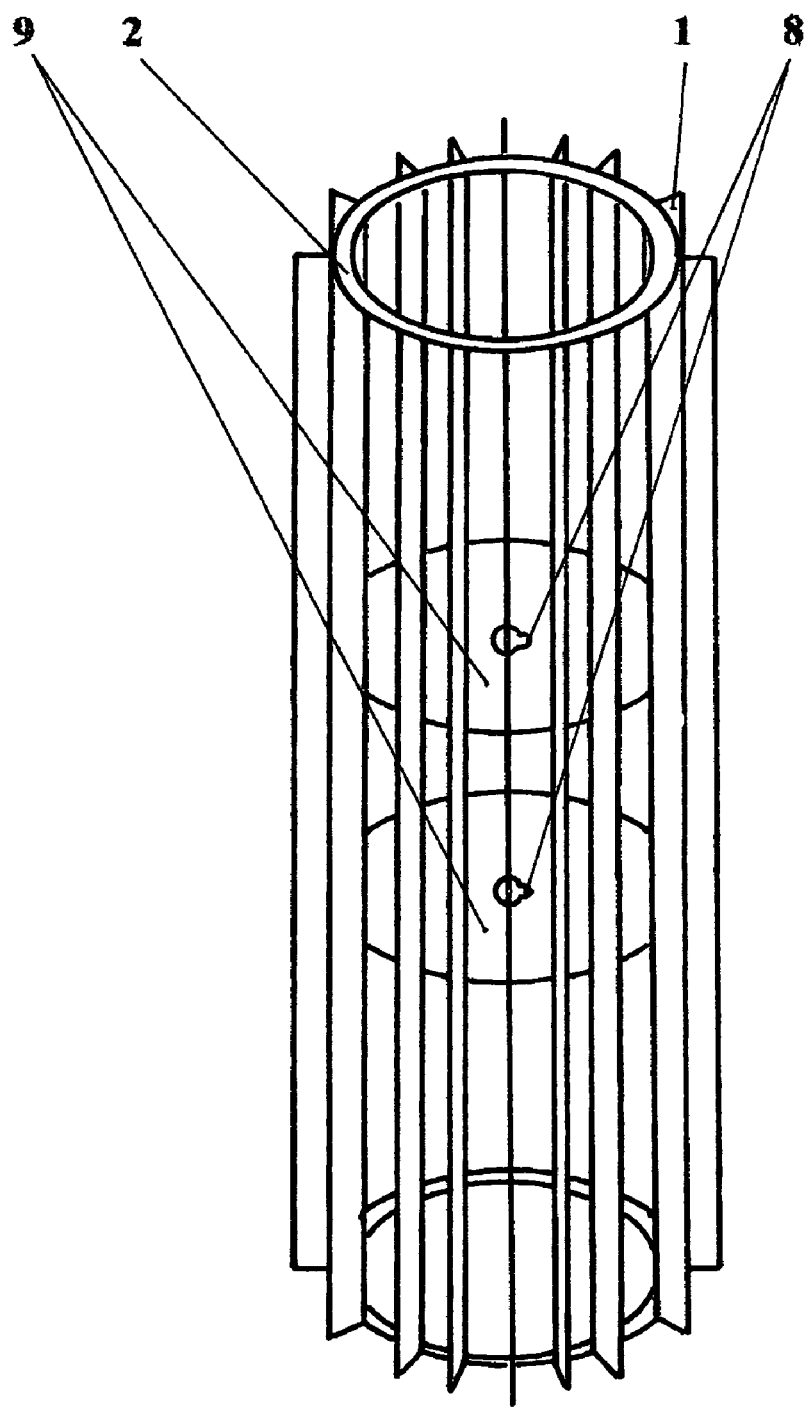
FIG. 4, Wind Wheel's (2) structure schematic drawing of this new invention
Figure 5:
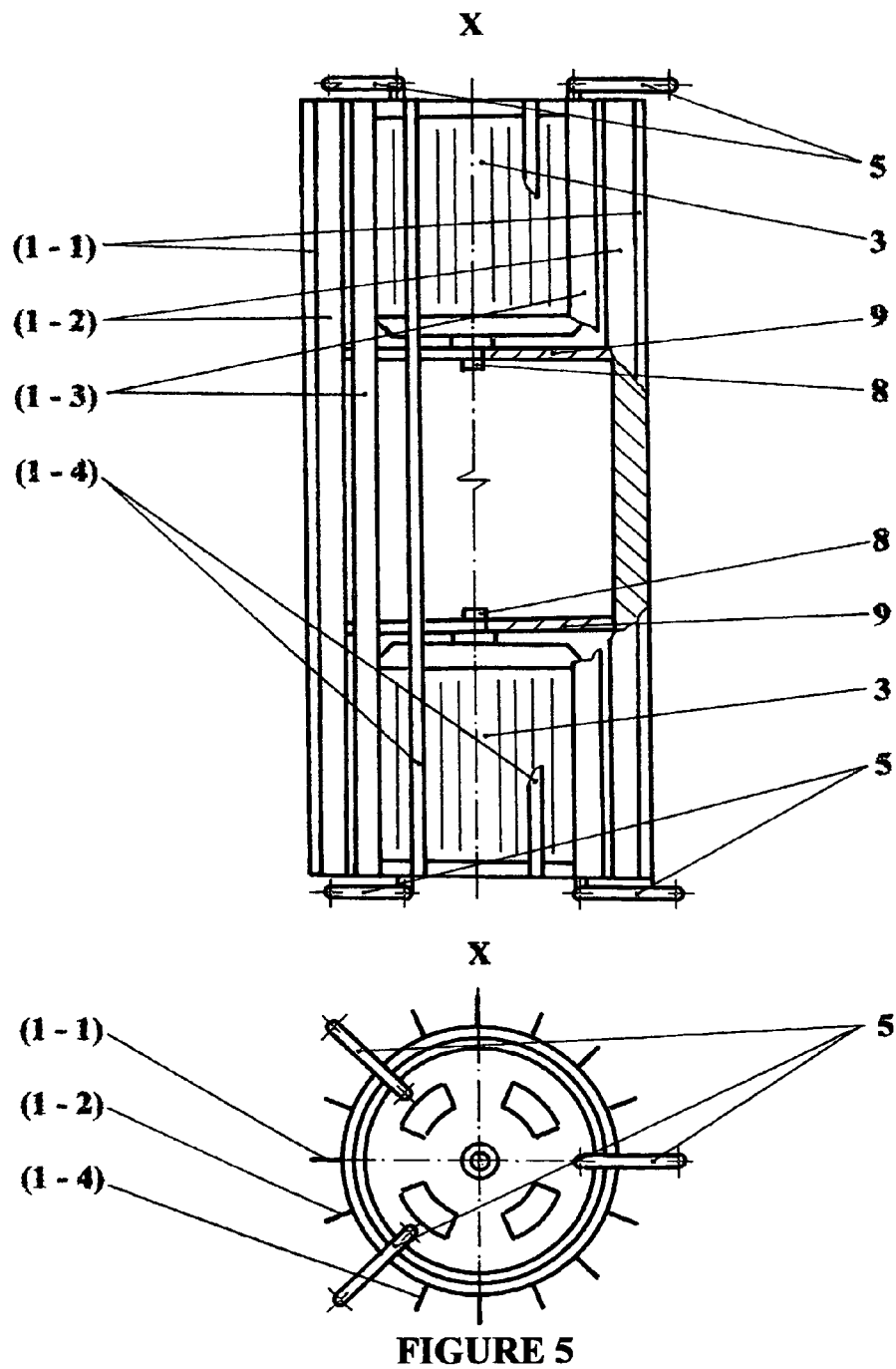
FIG. 5, Alternator (3) and Wind Wheel's (2) structure schematic drawing of this new invention.
Figure 6:
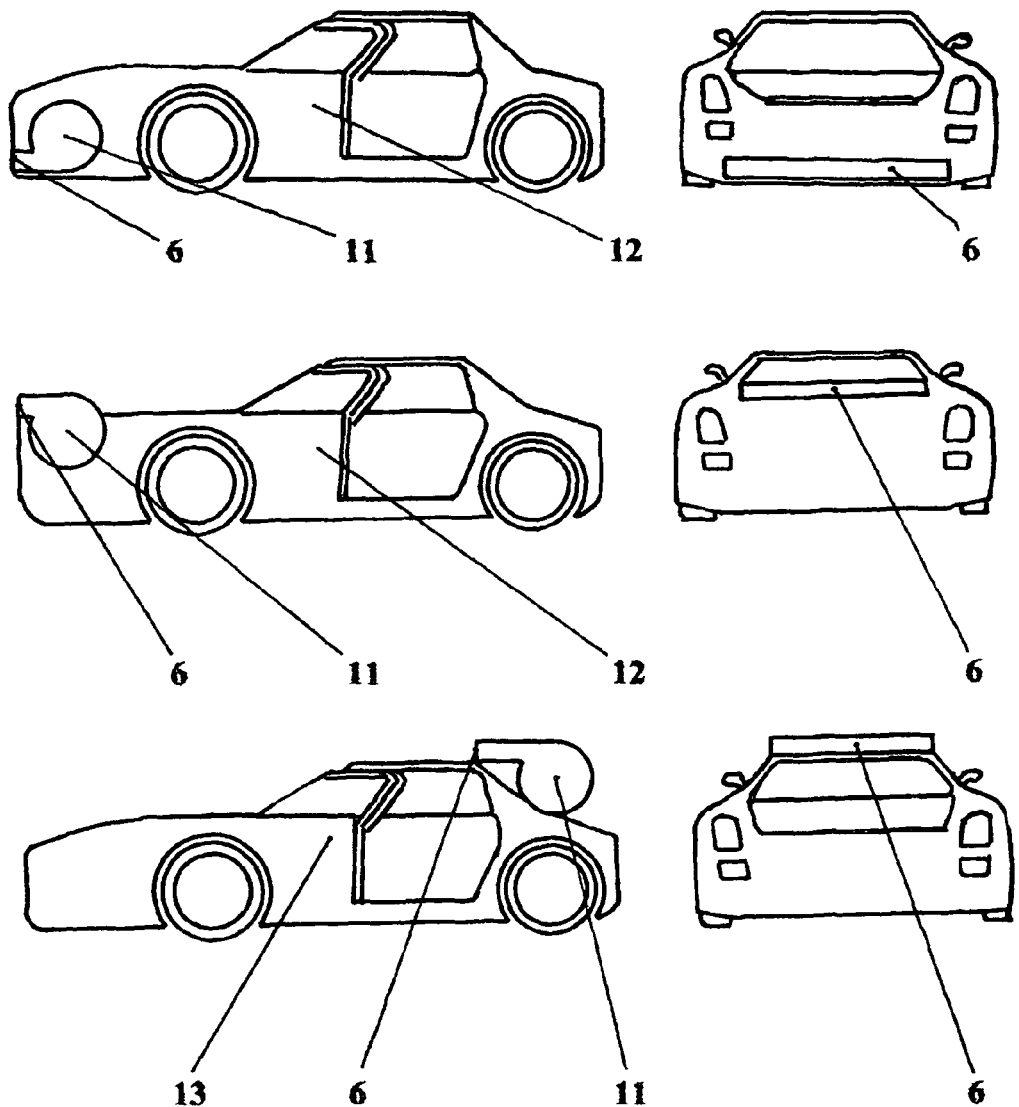
FIG. 6, this new invention (Portable Wind-driven Alternator) installed on the electrical automobiles (working status)
Figure 7:
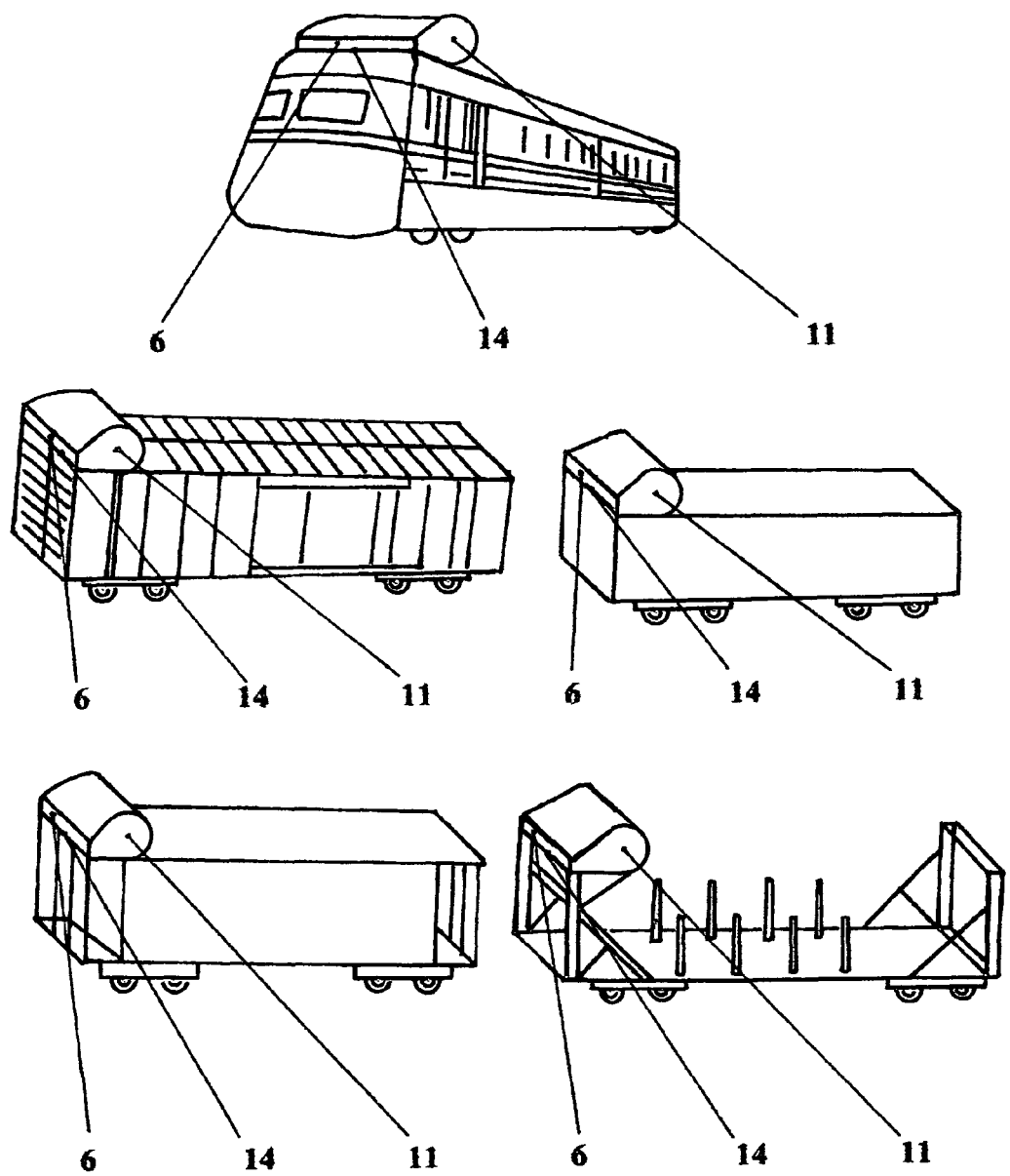
FIG. 7, this new invention (Portable Wind-driven Alternator) installed on the trains (working status)
Figure 8:
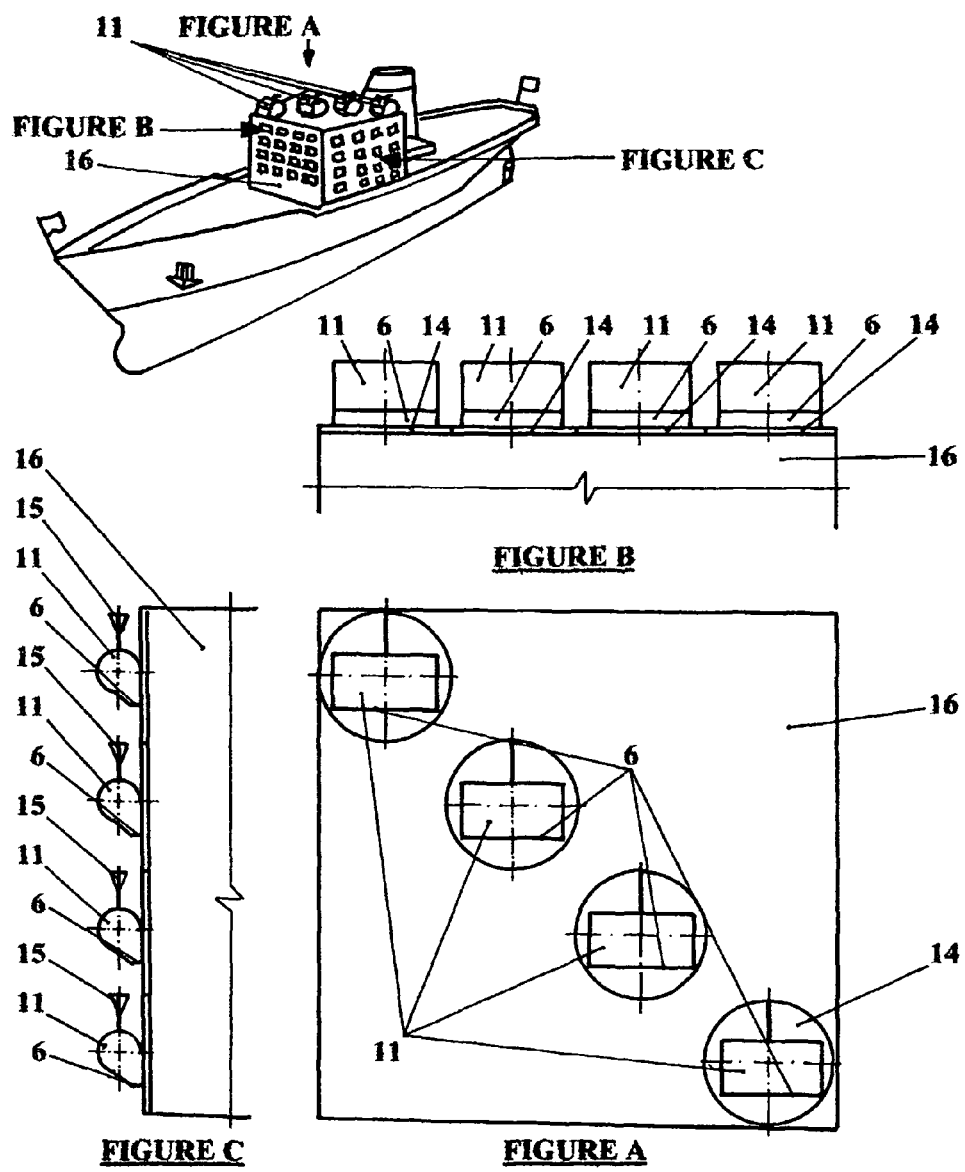
FIG. 8, this new invention (Portable Wind-driven Alternator) installed on the ships (working status)
Figure 9:
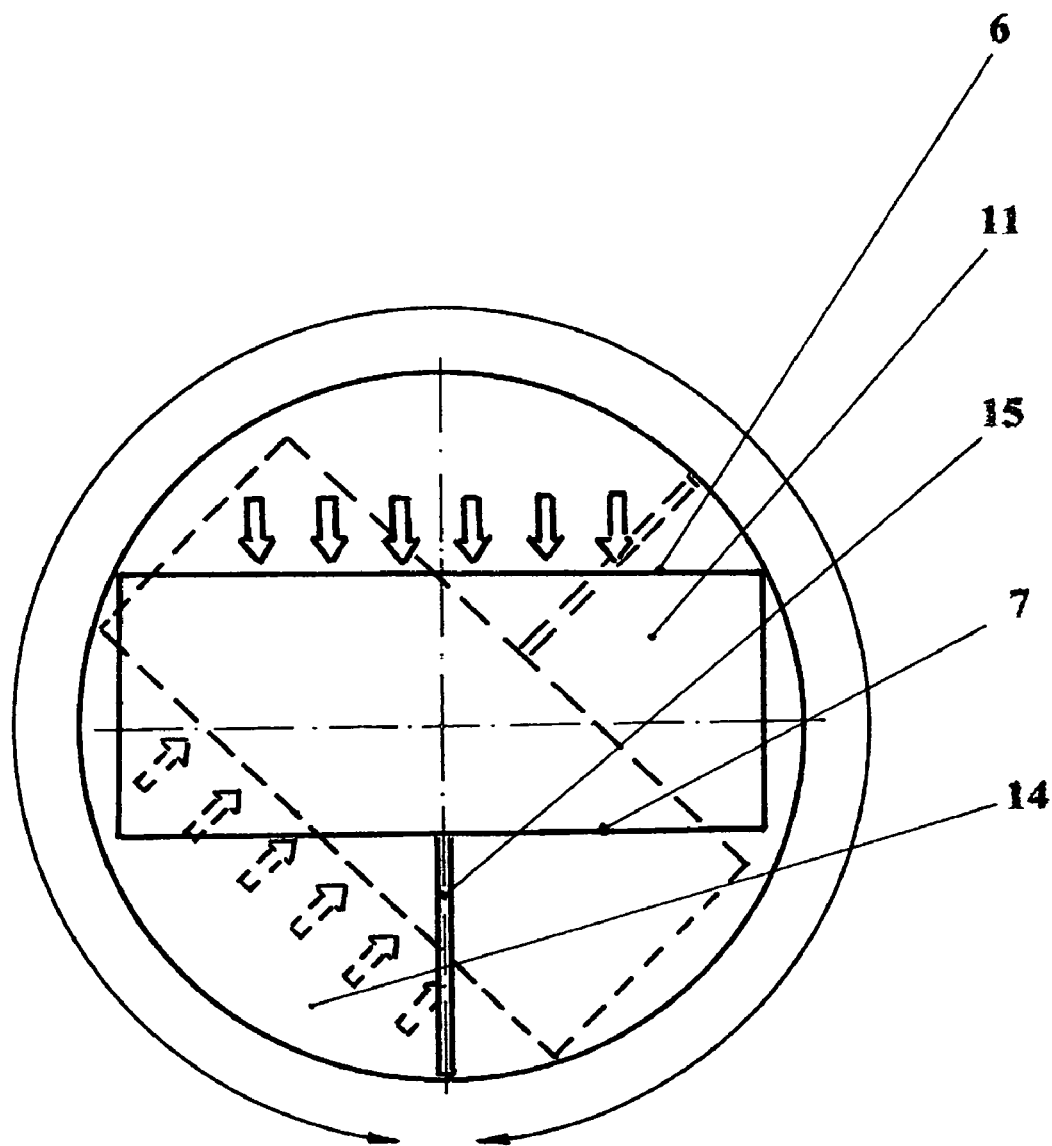
FIG. 9, this new invention of Wind Director.
Figure 10:
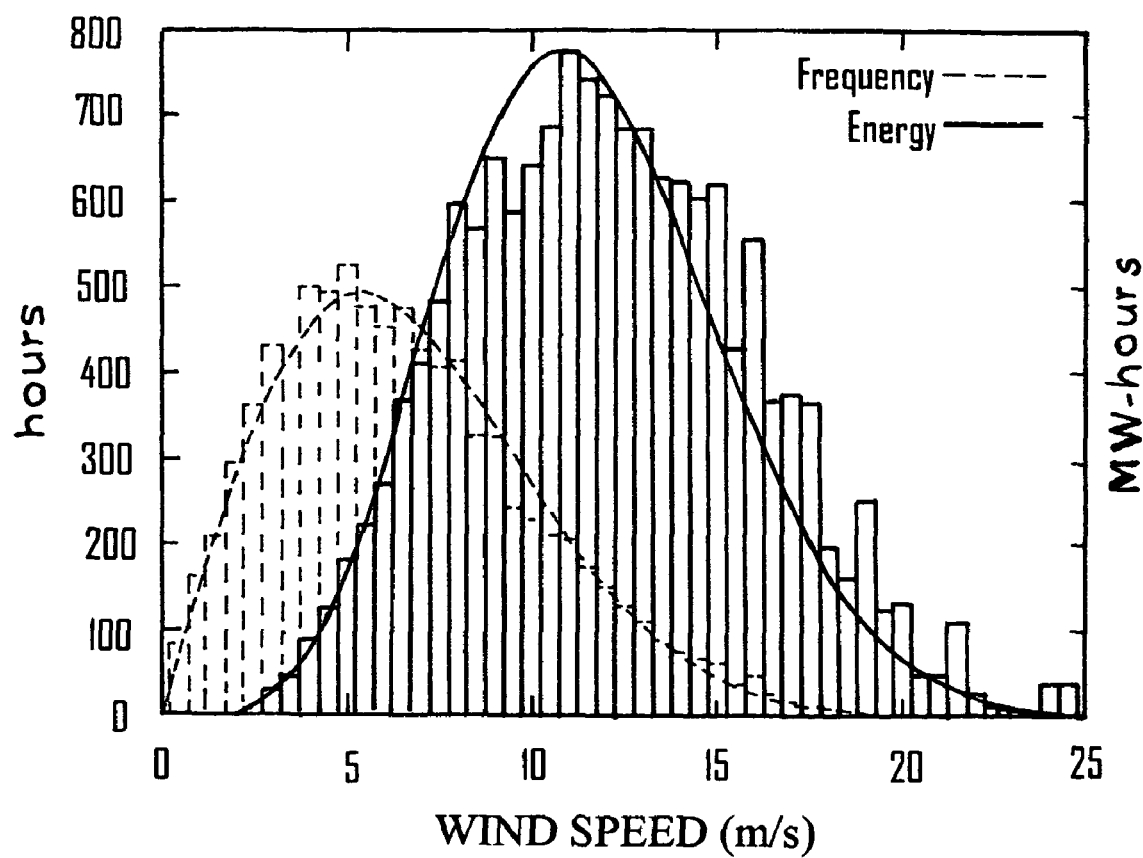
FIG. 10, it is a graph curve relating the wind speed to the energy output.

A). As shown in FIG. 1: The high speed wind with the high air pressure keeps running into the Air Intake (6) and rotates the Paddle Blades (1). And the wind goes out from the Air Exhaust (7) when the vehicle is moving at high speed. According to the Lever Law, the Wind rotates the Wind Wheel (2) by pushing the Paddle Blades (1) easily, smoothly and in increasing speed;

B). As shown in FIG. 2: The length of Wheel Hub (4) is the same as the width of vehicle. The height of the Air Intake (6) can be calculated out by the power of the Alternators (3);

C). As shown in FIG. 3: The Wind Wheel (2) is installed inside of the Wheel Hub (4). The length of the Wind Wheel (2) is the same as the length of Wheel Hub (4). The diameter of the Wind Wheel (2) must be greater than the diameter of the Alternators. The size of the Alternator can be calculated out by the power of the vehicle;

D). As shown in FIG. 4: The length of Paddle Blade (1) is the same as the length of the Wind Wheel (2). The area of Paddle Blade (1) is the same as the Air Intake (6). The number of Paddle Blades (1) can be obtained by the power of the Alternators (3);

E). As shown in FIG. 5: The Wind Wheel (2) each has one Wheel Supports (9) inside the hub. On each Wheel Support (9) one Alternator (3) is installed through the Axle Sleeve (8) and Axle key. One of the alternators (3) rotates clockwise and the other one rotates anti-clockwise Each Alternator (3) Hub has three Alternator Supports (5) which help to connect the Alternator (3) Supports outside Wheel Hub (4) as shown in FIG. 2;

F). As shown in FIG. 6: The Portable Wind-driven Alternator (11) installed on the Electrical Automobiles. For the new Vehicles (12): we can install the Portable Wind-driven Alternator (11) inside the Vehicles; for old Vehicles (13): we can install the Portable Wind-driven Alternator (11) outside the Vehicles. The Air Intake (6) always faces to the high speed Wind in both cases;

G). As shown in FIG. 7: The Portable Wind-driven Alternator installed on the Trains. On each train one Portable Wind-driven Alternator (11) carriage will be installed with Swivel Joint (14), the Portable Wind-driven Alternator (11) can turn 180° with Swivel Joint (14), when the train carriages direct other way. It will take only 2 minutes to rotate for 180°. When the trains on the traffic way, the Air Intake (6) always faces to the high speed Wind;

H). As shown in FIG. 8: The Portable Wind-driven Alternator (11) installed on the Ships. FIGURE (A) is the Vertical View; FIGURE (B) is the Front View; FIGURE (C) is Side View. The ship need to install more than three Portable Wind-driven Alternators (11) on the superstructure (16), that the number of The Portable Wind-driven Alternator (11) can be calculated out by the Horse Power of ship and width of ship. When the Ship is sailing on the ocean, the strongest gale may come from another direction, so the Wind-driven Alternator (11) must be installed with Swivel joint (14) and Wind Director (15). The Wind Director (15) can rotate the Portable Wind-driven Alternator (11) by any angle 360° automatically (as FIG. 9). So whenever the ship sails on the traffic way, the Air Intake (6) always faces to the high speed Wind.

The high speed Wind Energy with the stably high air pressure keeps running into the Air Intake (6). After pushing the Paddle Blade (1), the Wind goes out of the Air Exhaust (7) whenever the vehicles are moving at high speed. Thus the Paddle Blades (1) drives the Wind Wheel (2) to spin fast and smoothly. The Alternators (3) then produce the Electrical Energy.

1. On the Electrical Automobiles (include: Hybrid Vehicles & electrical motorcycle): The Electrical Energy will charge the battery of vehicles to extend the time of travel;

2. On the Trains: The Electrical Energy tail be use for the Air Conditioning, Refrigeration, lighting, etc. If Train Carriages have electrical transmission, the generated Electrical Energy can help to propel the train.

3. On the Ship: The Electrical Energy can be use for the Air Conditioning, Refrigeration, lighting, etc. The Electrical Energy may also help on the electrolysis of the sea water to obtain the hydrogen and the oxygen: one kilogram sea water can approximately be electrolyzed to ⅕ kilogram hydrogen and ⅘ kilogram oxygen as well as ³⁄₁₀₀ kilogram sea salt. This technology is very mature today. It is recently reported that the electrolysis producing one cubic meter hydrogen only need 2.5 KWH electrical energies with new technologies. Hydrogen can be used to charge the FUEL CELL to drive the ships. After the hydrogen passing through the FUEL CELL, clean water id obtained for crew use, so the ships do not have to carry a lot of water. The oxygen can be used for ship maintenance (Example: Welding) use. The sea salt can be sold at the market.

| Wind scale and Wind speed, Wind force list (for designed) | | | | |
|---|---|---|---|---|
| Wind | | wind speed | | $W0 = V^2/16$ |
| Class | Name | km/h (mi/h) | (m/s) | (kg/m²) |
| 0 | Calm | <1 (0.62) | 0-0.2 | 0-0.0025 |
| 1 | light air | 1-5 (0.62-3.1) | 0.3-1.5 | 0.0056-0.014 |
| 2 | light breeze | 6-11 (3.7-6.8) | 1.6-3.3 | 0.016-0.68 |
| 3 | Gentle breeze | 12-19 (7.46-11.8) | 3.4-5.4 | 0.72-1.82 |
| 4 | Moderate breeze | 20-28 (12.43-17.4) | 5.5-7.9 | 1.89-3.9 |
| 5 | Fresh breeze | 29-38 (18.02-23.6) | 8.0-10.7 | 4-7.16 |
| 6 | Strong breeze | 39-49 (24.23-30.45) | 10.8-13.8 | 7.29-11.9 |
| 7 | Moderate gale | 50-61 (31.07-37.9) | 13.9-17.1 | 12.08-18.28 |
| 8 | Fresh gale | 62-74 (38.53-45.98) | 17.2-20.7 | 18.49-26.78 |
| 9 | Strong gale | 75-88 (46.6-54.68) | 20.8-24.4 | 27.04-37.21 |
| 10 | Whole gale | 89-102 (55.3-63.38) | 24.5-28.4 | 37.52-50.41 |
| 11 | Storm | 103-117 (64-72.7) | 28.5-32.6 | 50.77-66.42 |
| 12 | Hurricane | >117 (72.7) | 32.7-36.9 | 66.42-85.1 |

The invention claimed is:

1. A portable wind driven alternator system comprising:
a squirrel cage having two alternators inside a wind wheel;
a wheel hub with a certain length, an air intake with a certain length, air exhaust with a certain length, a plurality of paddle blades and a vehicle; wherein the system can be mountable on different locations on the same vehicle; wherein,
the length of the wheel hub is the same as a width of the vehicle;
the length of the air intake is the same as the length of the wheel hub;
a height of the air intake can be calculated by the power output of the alternators;
the length and height of the paddle blades is the same as the air intake;
the air intake and air exhaust are aligned horizontally;
the length of the wind wheel is the same as the length of the paddle blades; and
the wind wheel has at least one wheel support inside the hub wherein on the wheel support, one alternator is installed through an axle-sleeve and an axle key; and
each alternator has three supports for connecting the alternator supports outside the wheel hub; and
wherein one of the alternators rotate clockwise and the other alternator rotates anti-clockwise; and
the portable wind driven alternator system can be rotated 180° by a swivel joint.

2. The portable wind driven alternator system according to claim 1, wherein the vehicle is a ship.

3. The portable wind driven alternator system according to claim 1, wherein the vehicle is a train.

4. The portable wind driven alternator system according to claim 1, wherein the vehicle is an electric vehicle.

* * * * *